UNITED STATES PATENT OFFICE.

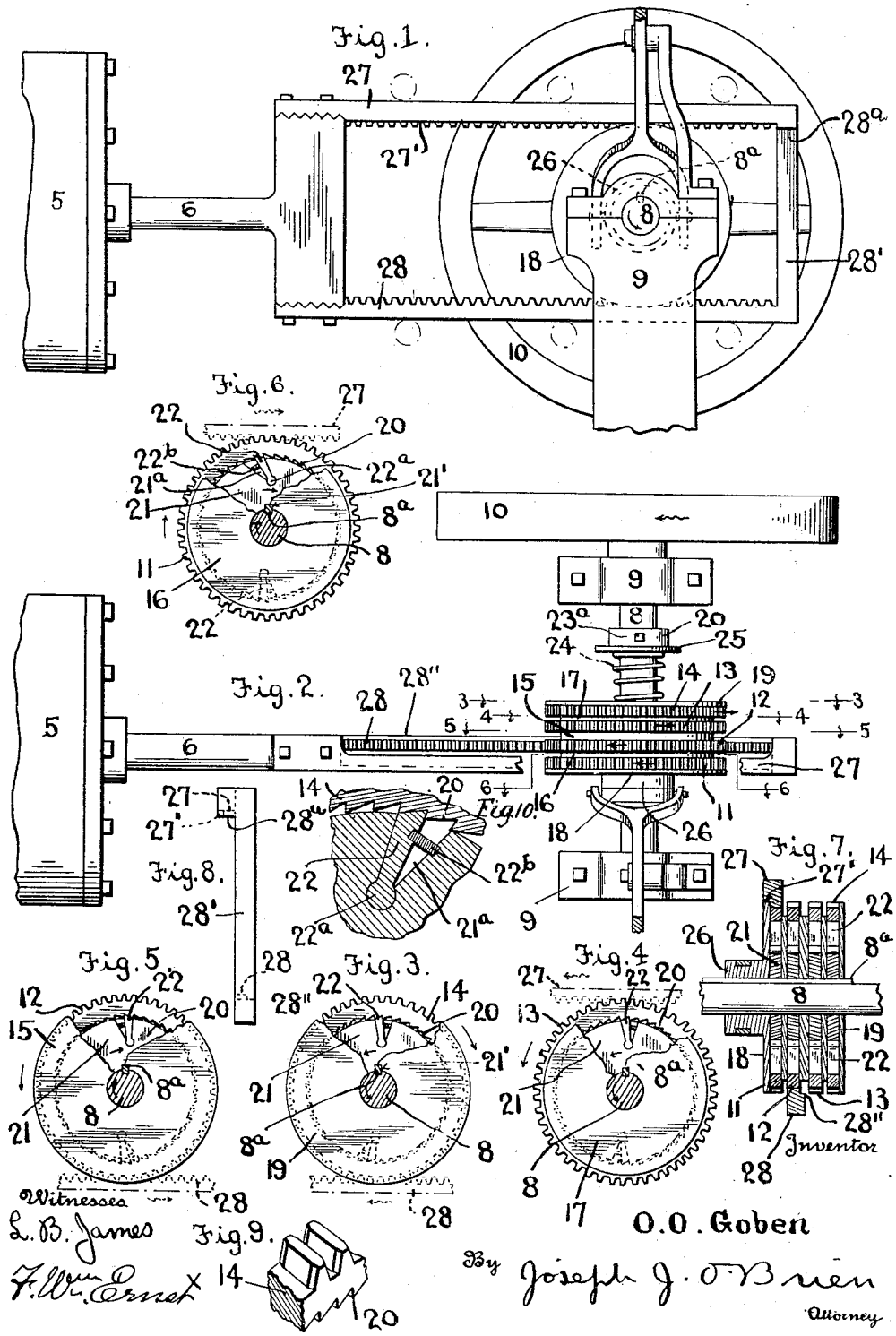

ORSINAS O. GOBEN, OF CHICKASHA, OKLAHOMA, ASSIGNOR OF ONE-SIXTH TO C. SIDNEY FOSTER AND ONE-SIXTH TO U. N. CHURCH, BOTH OF CHICKASHA, OKLAHOMA.

POWER-TRANSMITTING DEVICE.

1,219,287.     Specification of Letters Patent.     Patented Mar. 13, 1917.

Application filed September 14, 1914. Serial No. 861,722.

*To all whom it may concern:*

Be it known that I, ORSINAS O. GOBEN, a citizen of the United States, residing at Chickasha, in the county of Grady and State of Oklahoma, have invented certain new and useful Improvements in Power-Transmitting Devices, of which the following is a specification.

This invention relates to improvements in devices for converting reciprocating motion into rotary motion, and its leading object is to provide a simple device which can be applied to a steam engine piston rod and which will efficiently convert the reciprocating strokes of the piston rod into a rotary motion of the power transmitting shaft.

The invention is an improvement in a patent issued to L. F. Goben, on March 6, 1888, Number 379,199, and the improvement consists in the construction of a mechanism operable to transmit a rotary motion from the piston rod to the power shaft and containing an efficiently acting non-shifting rack driving element which is mounted on the piston rod.

The invention is embodied in a mechanism which includes a series of gears mounted on the drive shaft, a series of ratchet disks carrying spring pressed pawls adapted to having ratchet engagement with internal ratchet teeth formed on the gears, and arranged to having sliding movement on the power shaft; the gears and the ratchet means being arranged in sets of two complete organizations, so that the gears of each set will rotate in opposite directions to impart movement to the power shaft in one common direction; one organization being arranged to drive the power shaft in one direction and the other organization being arranged to drive the shaft in the opposite direction; means being provided to shift the complete mechanism of gears and ratchets on the shaft to bring one organization into coöperation with the double rack piston rod extension, and the other out of coöperation therewith.

With the above and other objects in view the invention relates to certain new and useful combinations, constructions and arrangements of parts, clearly described in the following specification and fully illustrated in the accompanying drawings, in which:—

Figure 1 is a side elevation.

Fig. 2 is a top plan view thereof.

Fig. 3 is a detail side view of one of the ratchet wheels, with certain parts broken away, a bottom drive being illustrated.

Fig. 4 is a similar view of another ratchet wheel, illustrating a top drive.

Fig. 5 is a similar view of still another ratchet wheel, illustrating a bottom drive.

Fig. 6 is a similar view of still another ratchet wheel illustrating a top drive.

Fig. 7 is a vertical sectional view through the four ratchet wheels.

Fig. 8 is a detail view of a connecting bar.

Fig. 9 is a detail view of a portion of one of the ratchet rings.

Fig. 10 is a detail sectional view showing the mounting of one of the pawls.

Referring to the accompanying drawings illustrating the preferred embodiment of the invention 5 designates an engine cylinder and 6 the piston rod thereof. The power shaft 8 is journaled in suitable bearings of the frame 9, and on one end thereof a fly wheel 10 is mounted.

On the power shaft 8 the gears 11, 12, 13 and 14 are arranged. These gears are arranged in sets of two and between the adjacent members 12 and 13 of the two independently acted on sets the spacing washer 15 is disposed. Between the members or gears 11 and 12 of one set of gears the antifriction washer 16 is disposed, and between the gears 13 and 14 of the other set the antifriction washer 17 is disposed. Against the outer face of the end gear 11 a large washer disk 18 is disposed, which has a diameter equal to the extreme diameter of the gear, and against the outer face of the end gear 14 a second large washer disk 19 is disposed, and said disk has a diameter equal to the largest diameter of said gear 14.

Each gear is formed with internal ratchet teeth 20, and within each gear a pawl carrying disk 21 is arranged. The pawl carrying disk 21 is formed with two or more notches 21ª cut through the peripheral edge portion thereof, and located at opposite points in said disk. The inner end portion of each notch is formed semi-circular and the other portion thereof widens toward the periphery of the disk. Within each notch a pawl 22 is disposed, and its inner end is rounded at 22ª to pivotally fit in the inner end portion of the notch, while its outer end is pointed to engage with the ratchet teeth 20. When the pawl is in its innermost position the point of the pawl will lie inside of the periphery thereof, and when in its operative position the free end of the pawl will project outwardly of the periphery. A small spring 22$^b$ serves to press the pawl against the ratchet teeth 20, one end of said spring being secured in a small recess formed in the disk and the other end being secured in a small recess formed in the pawl.

The teeth 20 of the gear 11 project in a direction opposite to the teeth 20 of the gear 12, and the teeth of each gear function to transmit motion to the drive shaft, through the coöperation of the pawls and under the impulses of the rack element. The gears 11 and 12 and the ratchet pawl disks therewithin constitute one complete organization, and the gears 13 and 14, and the ratchet pawl carrying disks therewithin constitute a second complete organization. The members of each organization are arranged so that the rack element when brought into engagement therewith will transmit constant rotary motion in one direction, and then by shifting the gears relative to the rack element will transmit constant rotary motion in the opposite direction.

A stop collar 23 is fixed on the power shaft by the set screw 23$^a$, and a spring 24 is disposed on the shaft and presses at one end against the end washer 19 and at the other end against the washer 25, which bears against the stop collar. The drive shaft is formed with a longitudinal key 8$^a$ and the ratchet carrying disks 21 have notches 21' whereby the pawl carrying disks are keyed to the shaft. A shifting collar 26 is slidable on the shaft 8 and is adapted, by cam action, to shift the two organizations of gears on the shaft, so as to move one set out of operative position and to move the other set into operative position.

The piston rod 6 has mounted thereon an upper rack bar 27 and a lower rack bar 28, which are connected at their outer ends to each other by the cross bar 28', the upper end of which is offset at 28$^a$. The upper bar 27 is adapted to engage one of the gears of each set and the lower rack bar 28 is adapted to engage the other gear of each set, simultaneously with the upper rack bar. Each gear is adapted to rotate freely in one direction and to transmit power to the drive shaft when rotated in the opposite direction, so that the alternating strokes of the piston rod will transmit a constant rotary motion to the drive shaft in one direction. The rack bar 27 is provided with a bearing shoulder 27' to engage the washer 18 and the rack bar 28 has a similar shoulder 28'' to engage the other end washer 19.

The gears and the pawl carrying disks are formed in duplicate of each other: the functions of transmission and reversal of direction of movement being effected by alternating the direction of the teeth and the direction of the pawls of the gears.

By means of my invention the loss of energy due to dead centering is avoided; as a positive driving connection is provided between the piston rod and the drive shaft, which will function whether the shaft is on the dead center or not. Vibration is also reduced to a minimum, and the transmission of power from the engine made more efficient.

Having described my invention I claim:—

A power device consisting of a power shaft, a series of disks keyed thereto, each disk having notches therein, spring pressed pawls in the notches, a series of ring gears inclosing the disks and having internal ratchet teeth engageable by the pawls, washers between the disks and gears, end washers, a driving element having an upper and a lower rack for engaging with different gears, a stop collar on the shaft, a spring between the stop collar and the opposing end washer, said driving element having shoulders to engage with the edge portions of the end washers, and means for shifting the disks and gears on the shaft.

In testimony whereof I affix my signature in presence of two witnesses.

Dr. ORSINAS O. GOBEN.

Witnesses:
JAMES L. CRAWFORD,
C. NOBLE BELT.

Copies of this patent may be obtained for five cents each, by addressing the "Commissioner of Patents, Washington, D. C."